(12) United States Patent
Nahlus et al.

(10) Patent No.: US 11,662,224 B2
(45) Date of Patent: May 30, 2023

(54) SYSTEMS AND METHODS FOR FAIL-SAFE RESOLVER EXCITATION

(71) Applicant: DELPHI TECHNOLOGIES IP LIMITED, St. Michael (BB)

(72) Inventors: Ihab Nahlus, Indianapolis, IN (US); Marc R. Engelhardt, Kokomo, IN (US); Mark R. Keyse, Sharpsville, IN (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 32 days.

(21) Appl. No.: 17/461,162

(22) Filed: Aug. 30, 2021

(65) Prior Publication Data

US 2023/0062191 A1  Mar. 2, 2023

(51) Int. Cl.
*G01D 5/20* (2006.01)

(52) U.S. Cl.
CPC .................................. *G01D 5/2073* (2013.01)

(58) Field of Classification Search
CPC .................................................... G01D 5/2073
See application file for complete search history.

(56) References Cited

U.S. PATENT DOCUMENTS

| | | | |
|---|---|---|---|
| 6,972,700 B2 | 12/2005 | Kanekawa et al. | |
| 7,840,364 B2 * | 11/2010 | Nakazato | G01D 3/08 702/58 |
| 10,040,475 B2 | 8/2018 | Wada et al. | |
| 10,116,192 B2 * | 10/2018 | Tiainen | G01D 5/204 |
| 2008/0172202 A1 | 7/2008 | Nakazato | |
| 2009/0179605 A1 | 7/2009 | Kanekawa et al. | |

FOREIGN PATENT DOCUMENTS

| | | |
|---|---|---|
| DE | 102015223539 A1 | 6/2017 |
| KR | 20160066923 A | 6/2016 |

OTHER PUBLICATIONS

Extended European Search report in EP application 22192032.5, dated Jan. 17, 2023.

* cited by examiner

*Primary Examiner* — Walter L Lindsay, Jr.
*Assistant Examiner* — Milton Gonzalez
(74) *Attorney, Agent, or Firm* — Joshua M. Haines; Bookoff McAndrews, PLLC

(57) ABSTRACT

A method for fail-safe resolver excitation includes generating a resolver excitation signal and providing the resolver excitation signal to an input of a first resolver control circuit and to an input of a second resolver control circuit. The method also includes, in response to the first resolver control circuit detecting a fault in the resolver excitation signal provided to the first resolver control circuit: biasing, using the first resolver control circuit, a first resolver amplifier; and communicating, via a communication bus between the first resolver control circuit and the second resolver control circuit, an indication to the second resolver control circuit that the first resolver control circuit detected the fault in the resolver excitation signal provided to the first resolver control circuit.

20 Claims, 4 Drawing Sheets

SYSTEMS AND METHODS FOR FAIL-SAFE RESOLVER EXCITATION

TECHNICAL FIELD

This disclosure relates to vehicle circuits, and in particular, to systems and methods for fail-safe resolver excitation.

BACKGROUND

Vehicles, such as cars, trucks, sport utility vehicles, crossovers, mini-vans, or other suitable vehicles, typically include various electric motors, such as permanent magnet motors or other suitable electric motors. Such electric motors may be used for various aspects of vehicle control or operation, such as vehicle propulsion or other suitable aspects of vehicle control or operation. Such an electric motor may be associated with a resolver for detecting a speed and position of the electric motor. A controller of a vehicle may use the detected speed and position of the electric motor to control various aspects of the vehicle.

SUMMARY

This disclosure relates generally to electric motor control.

An aspect of the disclosed embodiments includes a method for fail-safe resolver excitation. The method includes generating a resolver excitation signal, providing the resolver excitation signal to an input of a first resolver control circuit and to an input of a second resolver control circuit, and, in response to the first resolver control circuit detecting a fault in the resolver excitation signal provided to the first resolver control circuit: setting a first switch of the first resolver control circuit from a first position to a second position; and providing, via the first switch and to a first resolver amplifier, a first output signal having an output frequency and an amplitude corresponding to the resolver excitation signal.

Another aspect of the disclosed embodiments includes a system for fail-safe resolver excitation. The system includes a controller having a processor and a memory, the memory including instructions that, when executed by the controller, cause the controller to generate a resolver excitation signal, and provide the resolver excitation signal to an input of a first resolver control circuit and to an input of a second resolver control circuit. The first resolver control circuit, in response to detecting a fault in the resolver excitation signal provided to the first resolver control circuit, sets a first switch of the first resolver control circuit from a first position to a second position, and provides, via the first switch and to a first resolver amplifier, a first output signal having an output frequency and an amplitude corresponding to the resolver excitation signal.

Another aspect of the disclosed embodiments includes an apparatus for fail-safe resolver excitation. The apparatus includes a controller configured to generate a resolver excitation signal and provide the resolver excitation signal to an input of a first resolver control circuit and to an input of a second resolver control circuit. The first resolver control circuit, in response to detecting a fault in the resolver excitation signal provided to the first resolver control circuit, sets a first switch of the first resolver control circuit from a first position to a second position, and provides, via the first switch and to a first resolver amplifier, a first output signal having an output frequency and an amplitude corresponding to the resolver excitation signal. The second resolver control circuit, in response to the second resolver control circuit detecting a fault in the resolver excitation signal provided to the second resolver control circuit, sets a second switch of the second resolver control circuit from a first position to a second position, and provides, via the second switch and to a second resolver amplifier, a second output signal having an output frequency and an amplitude corresponding to the resolver excitation signal.

Another aspect of the disclosed embodiments includes a method for fail-safe resolver excitation. The method includes generating a resolver excitation signal and providing the resolver excitation signal to an input of a first resolver control circuit and to an input of a second resolver control circuit. The method also includes, in response to the first resolver control circuit detecting a fault in the resolver excitation signal provided to the first resolver control circuit: biasing, using the first resolver control circuit, a first resolver amplifier; and communicating, via a communication bus between the first resolver control circuit and the second resolver control circuit, an indication to the second resolver control circuit that the first resolver control circuit detected the fault in the resolver excitation signal provided to the first resolver control circuit.

Another aspect of the disclosed embodiments includes a system for fail-safe resolver excitation. The system includes a controller having a processor and a memory. The memory includes instructions that, when executed by the controller, cause the controller to generate a resolver excitation signal and provide the resolver excitation signal to an input of a first resolver control circuit and to an input of a second resolver control circuit. The first resolver control circuit is configured to, in response to detecting a fault in the resolver excitation signal provided to the first resolver control circuit bias a first resolver amplifier, and communicate, via a communication bus between the first resolver control circuit and the second resolver control circuit, an indication to the second resolver control circuit that the first resolver control circuit detected the fault in the resolver excitation signal provided to the first resolver control circuit.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
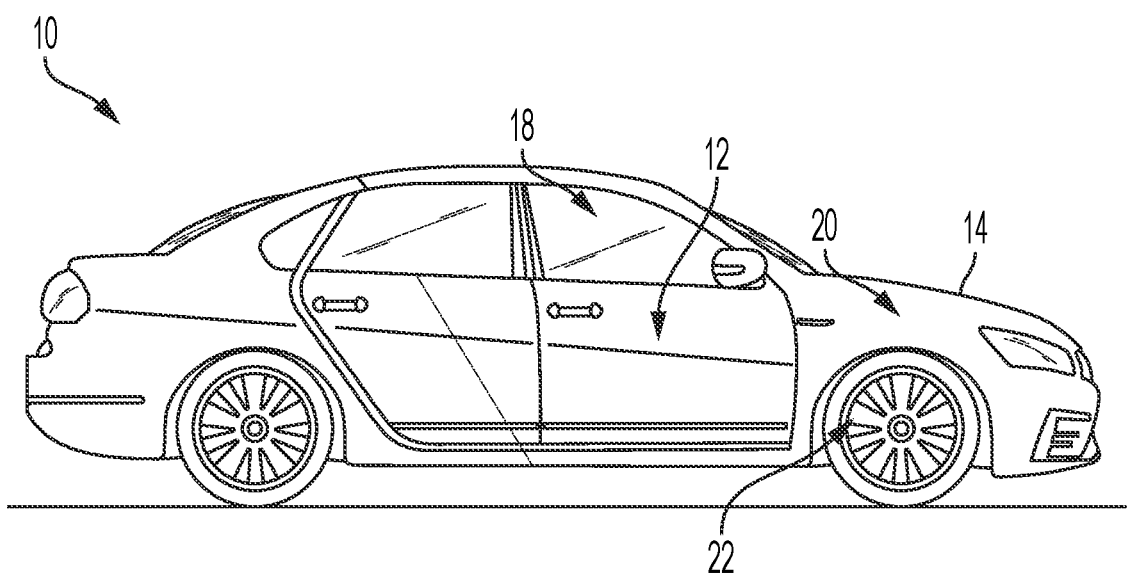
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, typically include various electric motors, such as permanent magnet motors or other suitable electric motors. Such electric motors may be used for various aspects of vehicle control or operation, such as vehicle propulsion or other suitable aspects of vehicle control or operation. Such an electric motor may be associated with a resolver for detecting a speed and position of the electric motor. A controller of a vehicle may use the detected speed and position of the electric motor to control various aspects of the vehicle.

Such a resolver may be prone to various single points of failure. Potential single point failure locations associated with the resolver may include an external power supply associated with the resolver (e.g., such as a failure of one or more inputs to the power supply, a failure of the power supply, a failure of outputs of the power supply or connections to an associated microprocessor or controller, and the like), the microprocessor or controller associated with the resolver (e.g. such as a failure of supply connections to the microprocessor, a failure of the microprocessor to supply an analog pulse width modulation signal and being unable to generate a usable sinewave, and the like), an active filter associated with the resolver (e.g., such as, the active filter not being powered up during a supply failure or a connection issue, which may result it no input stimulus being provided to a corresponding resolver amplifier, and the like), a passive filter associated with the resolver (e.g., such as a failure to provide input stimulus to the resolver amplifier), the resolver amplifier(s) (e.g., the supply powering the output amplifiers not being functional, a connection issue prevents the resolver amplifier from operating, and the like, which may result in a lack of resolver excitation), and the like.

Typically, when the resolver experiences any such single point failure, there may be a lack of useful resolver secondary sine or cosine outputs, which may prevent the system associated with resolver from being kept in a safe state of operation (e.g., because no knowledge of electrical machine speed or position is available or obtainable).

In typical systems, an excitation signal to the resolver primary inputs may be performed in a serial path. This approach includes various components and connections within the serial path. A fault in any of the various components or connections in the serial path may result in a single point failure. Such failures will result in the loss of speed and position information of the monitored electrical machine.

Accordingly, systems and methods, such as those described herein, configured to provide fail-safe resolver excitation, may be desirable. In some embodiments, the systems and the methods described herein may be configured to provide for a fail-safe resolver output signal with each end of the resolver primary coil being driven by independent resolver excitation circuits. The excitation circuits may be electrically isolated from each other with the exception of a resolver-to-resolver communication bus. In some embodiments, the independent excitation circuits may be contained within two independent pieces of silicon.

In some embodiments, a microprocessor or controller associated with the resolver may generate a resolver excitation signal. The systems and methods described herein may be configured to apply the resolver excitation signal to respective resolver excitation input of each resolver excitation circuit. In some embodiments, each resolver excitation circuit includes configurable logic, which may be configured to detect, over a wide range of input frequencies, a loss, or an unexpected deviation of an expected resolver excitation input at one or both resolver excitation inputs.

In some embodiments, each resolver excitation circuit may include independent, internal resolver exciter waveform generator logic, which may be used to provide an exciter excitation waveform to a corresponding resolver amplifier. Each resolver exciting waveform generator logic may be configurable to provide the same output frequency and amplitude as the resolver excitation signal generated and provided by microprocessor provides.

In some embodiments, the systems and methods described herein may be configured to, prior to the detection of a fault of a resolver excitation input in either resolver excitation circuits, set logic switches (e.g., associated with each respective resolver excitation circuit), such that the resolver excitation input provided by the microprocessor is used as an input to each respective resolver amplifier.

In some embodiments, the systems and methods described herein may be configured to, if an input fault is detected in either or both of the resolver excitation circuits, set the corresponding logic switch (e.g., in the faulted resolver excitation circuit), such that, if a resolver excitation signal is still required by the resolver, the resolver excitation signal provided by the microprocessor will not be provided to the corresponding resolver amplifier. The systems and methods described herein may be configured to, responsive to a fault in one or both of the resolver excitation circuits, provide an input to the corresponding resolver amplifier via the respective resolver exciter waveform generator logic.

In some embodiments, the systems and methods described herein may be configured to, if a fault is detected in a first resolver excitation circuit (e.g., but not in a second resolver excitation circuit), bias a corresponding resolver amplifier (e.g., which may include fixing the resolver amplifier to mid-supply). The systems and methods described herein may be configured to provide information, to the second resolver excitation circuit, through an inter-amplifier communication bus, indicating that the first resolver excitation circuit is faulty. The systems and methods described herein may be configured to, responsive to receiving the information indicating the first resolver excitation circuit is faulty, double, using the second resolver control circuit, a gain of a second resolver amplifier (e.g., which may allow for the same excitation voltage for the resolver as prior to any fault being detected). The systems and methods described herein may be configured to, using the microprocessor, derive the electrical machine speed and position via the resolver interface.

In some embodiments, the systems and methods described herein may be configured to, if a fault is detected in the second resolver excitation circuit (e.g., but not in the first resolver excitation circuit), bias a corresponding resolver amplifier (e.g., which may include fixing the resolver amplifier to mid-supply). The systems and methods described herein may be configured to provide information, to the first resolver excitation circuit, through the inter-amplifier communication bus, indicating that the second resolver excitation circuit is faulty. The systems and methods described herein may be configured to, responsive to receiving the information indicating the second resolver excitation circuit is faulty, double, using the first resolver control circuit, a gain of the first resolver amplifier (e.g., which may allow for the same excitation voltage for the resolver as prior to any fault being detected). The systems and methods described herein may be configured to, using the microprocessor, derive the electrical machine speed and position via the resolver interface.

In some embodiments, the systems and methods described herein may be configured to, responsive to fixing of the resolver amplifier associated with the faulted resolver excitation circuit to mid-supply, ensure that the two resolver amplifier outputs cannot work out of phase with each other and affect an output value and wave shape (e.g., because it is no longer possible to keep these two signals in phase with each other).

In some embodiments, the systems and methods described herein may be configured to, in response to detecting a fault in both of the first resolver excitation circuit and the second resolver excitation circuit, fix (e.g., using the first resolver excitation circuit) the associated resolver amplifier to mid-supply and drive (e.g., using the resolver amplifier associated with the second resolver excitation circuit) the resolver with double the programmed gain using the generated exciter waveform.

In some embodiments, the systems and methods described herein may be configured to use independent supplies to corresponding power logic, to reduce or eliminate single point failures within each resolver excitation circuit. In some embodiments, the systems and methods described herein may be configured to supply power, from the resolver, to each resolver amplifier. In some embodiments, the systems and methods described herein may be configured to continue to drive the resolver primary and to provide speed information and position information of an electric machine (e.g., in the presence of many single point failures).

In some embodiments, the systems and methods may be configured to, under normal or desired operating conditions, drive, using the first resolver excitation circuit and the second resolver excitation circuit, the resolver (e.g., in opposite phases to each other). The systems and methods described herein may be configured to, in the presence of a fault, detect, using both the first resolver excitation circuit and the second resolver excitation circuit, the fault. The systems and methods described herein may be configured to set one resolver excitation circuit to mid-supply, while the other resolver excitation circuit doubles the amplitude to maintain the original programmed overall amplitude. The systems and methods described herein may be configured to perform such functions under a multitude of single point failures, including loss of digital core in one integrated circuit (e.g., one resolver excitation circuit). The systems and methods described herein may be configured to coordinate the two-resolver excitation circuits using a communication bus between the two-resolver excitation circuits.

It should be understood that, while the systems and methods described sets one resolver excitation circuit to mid-supply, while doubling, using the other resolver excitation circuit, the gain of a corresponding resolver amplifier (e.g., during a failure mode), the two resolver excitation circuit resolver outputs may not be synced together (e.g., if both resolver excitation circuits continue to drive the resolver, it may result in cancellation of the signal and/or harmonic distortions (due to different frequencies)).

In some embodiments, the systems and methods described herein may be configured to generate a resolver excitation signal. The systems and methods described herein may be configured to provide the resolver excitation signal to an input of a first resolver control circuit and to an input of a second resolver control circuit. In some embodiments, the first resolver control circuit is independent from the second resolver control circuit. In some embodiments, the first resolver control circuit is disposed on a first silicon component and the second resolver control circuit is disposed on a second component, separate from the first silicon component.

The systems and methods described herein may be configured to, in response to the first resolver control circuit detecting a fault in the resolver excitation signal provided to the first resolver control circuit, set a first switch of the first resolver control circuit from a first position to a second position, and provide, via the first switch and to a first resolver amplifier, a first output signal having an output frequency and an amplitude that are programmed in the local memory.

In some embodiments, the systems and methods described herein may be configured to, prior to the first resolver control circuit detecting the fault in the resolver excitation signal provided to the first resolver control circuit, set the first switch to the first position. The systems and methods described herein may be configured to, in response to the first switch being set to the first position, provide, the first resolver amplifier, the resolver excitation signal provided to the first resolver control circuit.

In some embodiments, the systems and methods described herein may be configured to, in response to the first resolver control circuit detecting the fault in the resolver excitation signal provided to the first resolver control circuit, fix the first resolver control circuit to a mid-supply. The systems and methods described herein may be configured to, in response to receiving, by the second resolver control circuit and via a communication bus between the first resolver control circuit and the second resolver control circuit, an indication that the first resolver control circuit is set to mid-supply, double, using the second resolver control circuit, the gain of the second resolver amplifier.

In some embodiments, the systems and methods described herein may be configured to, in response to the second resolver control circuit detecting a fault in the resolver excitation signal provided to the second resolver control circuit, set a second switch of the second resolver control circuit from a first position to a second position, and provide, via the second switch and to a second resolver amplifier, a second output signal having an output frequency and an amplitude that are programmed in the local memory.

In some embodiments, the systems and methods described herein may be configured to, prior to the second resolver control circuit detecting the fault in the resolver excitation signal provided to the second resolver control circuit, set the second switch to the first position. The systems and methods described herein may be configured to, in response to the second switch being set to the first position, provide, to the second resolver amplifier, the resolver excitation signal provided to the second resolver control circuit.

In some embodiments, the systems and methods described herein may be configured to, in response to the second resolver control circuit detecting the fault in the resolver excitation signal provided to the second resolver control circuit, fix the second resolver control circuit to a mid-supply. The systems and methods described herein may be configured to, in response to receiving, by the first resolver control circuit via the communication bus between the first resolver control circuit and the second resolver control circuit, an indication that the second resolver control circuit is set to mid-supply, double, using the first resolver control circuit, the gain of the first resolver amplifier.

In some embodiments, the systems and methods described herein may be configured to, in response to the first resolver control circuit detecting a fault in the resolver excitation signal provided to the first resolver control circuit and in response to the second resolver control circuit detecting the fault in the resolver excitation signal provided to the second resolver control circuit, fix the first resolver control circuit to a mid-supply. The systems and methods described herein may be configured to, in response to setting the first resolver control circuit to mid-supply, double, using the second resolver control circuit, the gain of the second resolver amplifier.

In some embodiments, the systems and methods described herein may be configured to generate a resolver excitation signal. The systems and methods described herein may be configured to provide the resolver excitation signal to an input of a first resolver control circuit and to an input of a second resolver control circuit. In some embodiments, the first resolver control circuit is independent from the second resolver control circuit. In some embodiments, the first resolver control circuit is disposed on a first silicon component and the second resolver control circuit is disposed on a second component, separate from the first silicon component.

In some embodiments, the systems and methods described herein may be configured to, in response to the first resolver control circuit detecting a fault in the resolver excitation signal provided to the first resolver control circuit, bias, using the first resolver control circuit, a first resolver amplifier, and communicate, via a communication bus between the first resolver control circuit and the second resolver control circuit, an indication to the second resolver control circuit that the first resolver control circuit detected the fault in the resolver excitation signal provided to the first resolver control circuit. In some embodiments, biasing the first resolver amplifier and/or the second resolver amplifier may include fixing the first resolver amplifier and/or the second resolver amplifier to mid-supply.

The systems and methods described herein may be configure to, in response to the first resolver control circuit not detecting a fault in the resolver excitation signal provided to the first resolver control circuit, setting a first switch of the first resolver control circuit to a first position. The systems and methods described herein may be configure to, in response to the first switch being set to the first position, provide the resolver excitation signal provided to the first resolver control circuit to the first resolver amplifier.

The systems and methods described herein may be configure to, in response to the second resolver control circuit detecting a fault in the resolver excitation signal provided to the second resolver control circuit and in response to receiving, by the second resolver control circuit and via the communication bus, the indication that the first resolver control circuit detected the fault in the resolver excitation signal provided to the first resolver control circuit: (i) set a second switch of the second resolver control circuit from a first position to a second position; (ii) double, using the second resolver control circuit, a gain of a second resolver amplifier; (iii) provide, via the second switch and to a second resolver amplifier, a second output signal having an output frequency and an amplitude associated with an expected resolver excitation signal corresponding to the resolver excitation signal provided to the second resolver control circuit; (iv) and communicate, via the communication bus between the first resolver control circuit and the second resolver control circuit, an indication to the first resolver control circuit that the second resolver control circuit detected the fault in the resolver excitation signal provided to the second resolver control circuit.

The systems and methods described herein may be configure to, in response to the second resolver control circuit not detecting the fault in the resolver excitation signal provided to the second resolver control circuit, set the second switch of the second resolver control circuit to the first position. The systems and methods described herein may be configure to, in response to the second switch being set to the first position, provide the resolver excitation signal provided to the second resolver control circuit to a second resolver amplifier.

The systems and methods described herein may be configure to, in response to receiving, by the second resolver control circuit and via the communication bus between the first resolver control circuit and the second resolver control circuit, the indication that the first resolver control circuit detected the fault in the resolver excitation signal provided to the first resolver control circuit, double, using the second resolver control circuit, the gain of the second resolver amplifier.

The systems and methods described herein may be configure to, in response to the second resolver control circuit receiving, via the communication bus between the first resolver control circuit and the second resolver control circuit, the indication that the first resolver control circuit detected the fault in the resolver excitation signal provided to the first resolver control circuit and in response to the second resolver control circuit not detecting the fault in the resolver excitation signal provided to the second resolver control circuit, double, using the second resolver control circuit, the gain of the second resolver amplifier, and provide, via the second switch of the second resolver control circuit in the first position, the resolver excitation signal provided to the second resolver control circuit to a second resolver amplifier.

The systems and methods described herein may be configure to, in response to the second resolver control circuit detecting a fault in the resolver excitation signal provided to the second resolver control circuit and in response to an absence of a fault in the resolver excitation signal provided to the first resolver control circuit, bias, using the second resolver control circuit, the second resolver amplifier, and communicate, via the communication bus between the first resolver control circuit and the second resolver control circuit, an indication to the first resolver control circuit that the second resolver control circuit detected the fault in the resolver excitation signal provided to the second resolver control circuit.

The systems and methods described herein may be configure to, in response to receiving, by the first resolver control circuit, from the second resolver control circuit via the communication bus between the first resolver control circuit and the second resolver control circuit, an indication that the second resolver control circuit detected a fault in the resolver excitation signal provided to the second resolver control circuit, double, using the first resolver control circuit, the gain of the first resolver amplifier, and provide, via the first switch of the first resolver control circuit in the first position, the resolver excitation signal provided to the first resolver control circuit to the first resolver amplifier.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
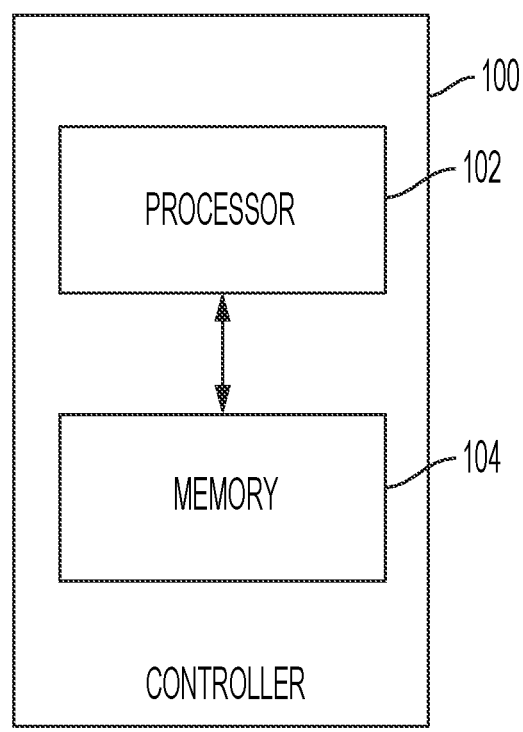
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

Figure 3:
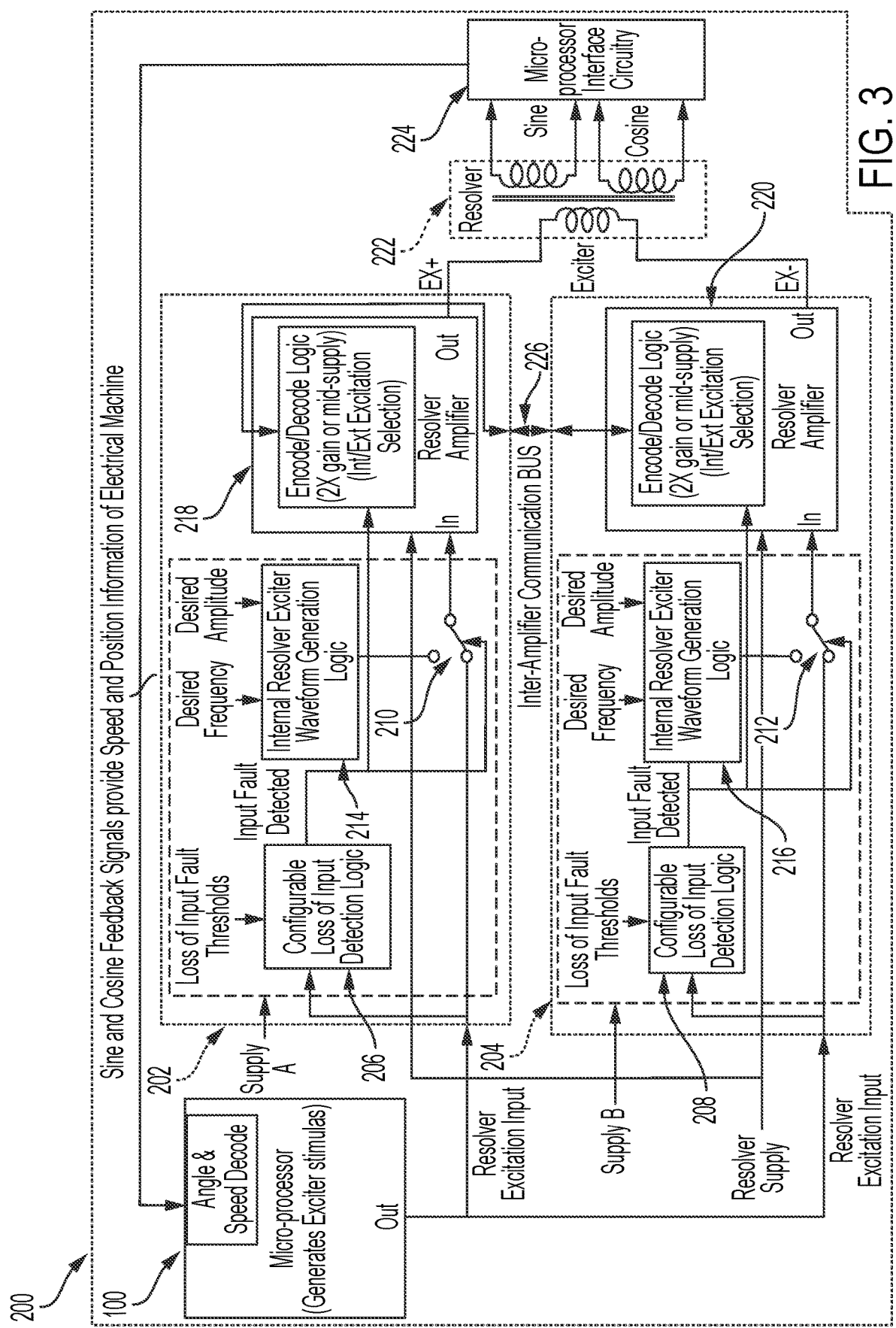
FIG. 3 generally illustrates a fail-safe resolver excitation system according to the principles of the present disclosure.

In some embodiments, the controller 100 may be configured to operate a fail-safe resolver excitation system 200, as is generally illustrated FIG. 3. For example, the controller 100 may generate a resolver excitation signal for exciting the resolver 222. The resolver may include any suitable resolver configured to provide sine and/or cosine outputs, which may be used by the controller 100 to detect or determine speed and/or position of an associated electric machine (e.g., which may be used to control various aspects of the vehicle 10). The systems and methods described herein may be configured to, using the controller 100, derive the electrical machine speed and position via the resolver interface 224.

The controller 100 may provide the resolver excitation signal to an input of a first resolver control circuit 202 and to an input of a second resolver control circuit 204. The first resolver control circuit 202 may be independent from the second resolver control circuit 204. In some embodiments, the first resolver control circuit 202 may be disposed on a first silicon component and the second resolver control circuit 204 may be disposed on a second component, separate from the first silicon component.

The first resolver control circuit 202 may be configured to detect faults in the system 200, such as faults in the resolver excitation signal or other suitable faults, such as those described herein. First resolver control circuit 202 includes configurable logic 206, which may be configured to detect, over a wide range of input frequencies, a loss, or an unexpected deviation of an expected resolver excitation input at first resolver control circuit 202. Additionally, or alternatively, the second resolver control circuit 204 may be configured to detect faults in the system 200, such as faults in the resolver excitation signal or other suitable faults, such as those described herein. Second resolver control circuit 204 includes configurable logic 208, which may be configured to detect, over a wide range of input frequencies, a loss, or an unexpected deviation of an expected resolver excitation input at second resolver control circuit 204.

The first resolver control circuit 202, in response to detecting a fault in the resolver excitation signal provided to the first resolver control circuit 202 or other suitable fault in the system 200, may fix the first resolver amplifier 218 to a mid-supply. The first resolver control circuit 202 may communicate, via an inter-amplifier communication bus 226, information, to the second resolver control circuit 204, indicating that the first resolver control circuit 202 has detected the fault and/or that the first resolver control circuit 202 is set to mid-supply. The second resolver control circuit 204 may, in response to receiving the information indicating that the first resolver control circuit 202 detected the fault and/or that the first resolver control circuit 202 is set to mid-supply, double, using the second resolver control circuit, the gain of the second resolver amplifier 220.

In some embodiments, the first resolver control circuit 202 may, in response to detecting a fault in the resolver excitation signal provided to the first resolver control circuit 202, set a first switch 210 from a first position to a second position. The first resolver control circuit 202 may provide, via the first switch 210 and to the first resolver amplifier 218, a first output signal having an output frequency and an amplitude that are programmed in memory. In some embodiments, an internal resolver exciter waveform generator 214 associated with the first resolver control circuit 202 may be configured to generate the first output signal having an output frequency and an amplitude that are programmed in the local memory and may be associated with an expected resolver excitation signal (e.g., which may include a resolver excitation signal programmed into memory of the internal resolver exciter waveform generator 214 and may correspond to the resolver excitation signal provided by the controller 100 or other suitable resolver excitation signals).

In some embodiments, the first resolver control circuit 202 may, prior to detecting the fault in the resolver excitation signal provided to the first resolver control circuit, set the first switch 210 to the first position. The first resolver control circuit 202 may, in response to the first switch 210 being set to the first position, provide the first resolver amplifier 218, the resolver excitation signal provided to the first resolver control circuit 202.

In some embodiments, the second resolver control circuit 204, in response to detecting a fault in the resolver excitation signal provided to the second resolver control circuit 204 or other suitable fault in the system 200 and in response to receiving the information indicating that the first resolver control circuit 202 is fault and/or that the first resolver amplifier 218 is fixed to mid-supply, may double the gain of the second resolver amplifier 220 and may set a second switch 212 from a first position to a second position. For example, prior to the second resolver control circuit 204 detecting the fault in the resolver excitation signal provided to the second resolver control circuit 204, the second resolver control circuit 204 may set the second switch 212 to the first position, which may provide, a second resolver amplifier 220, with the resolver excitation signal provided to the second resolver control circuit 204.

In response to setting the second switch 212 to the second position, the second resolver control circuit 204 may provide, via the second switch 212 and to the second resolver amplifier 220, a second output signal having an output frequency and an amplitude that are programmed in the local memory. In some embodiments, an internal resolver exciter waveform generator 216 associated with the second resolver control circuit 204 may be configured to generate the second output signal having an output frequency and an amplitude that are programmed in the local memory and may be associated with an expected resolver excitation signal (e.g., which may include a resolver excitation signal programmed into memory of the internal resolver exciter waveform generator 216 and may correspond to the resolver excitation signal provided by the controller 100 or other suitable resolver excitation signals).

In some embodiments, the second resolver control circuit 204 may, in response to detecting the fault and in response to an absence of a fault in the first resolver control circuit 202, fix the second resolver amplifier 220 to a mid-supply. The second resolver control circuit 204 may communicate, via the inter-amplifier communication bus 226, information, to the first resolver control circuit 202, indicating that the second resolver control circuit 204 has detected the fault and/or that the second resolver amplifier 220 is set to mid-supply. The first resolver control circuit 202 may, in response to receiving the information indicating that the second resolver control circuit 204 detected the fault and/or that the second resolver amplifier 220 is set to mid-supply, double the gain of the first resolver amplifier 218.

In some embodiments, the controller 100 and/or the system 200 may perform the methods described herein. However, the methods described herein as performed by the controller 100 and/or the system 200 are not meant to be limiting, and any type of software executed on a controller or processor can perform the methods described herein without departing from the scope of this disclosure. For example, a controller, such as a processor executing software within a computing device, can perform the methods described herein.

Figure 4:
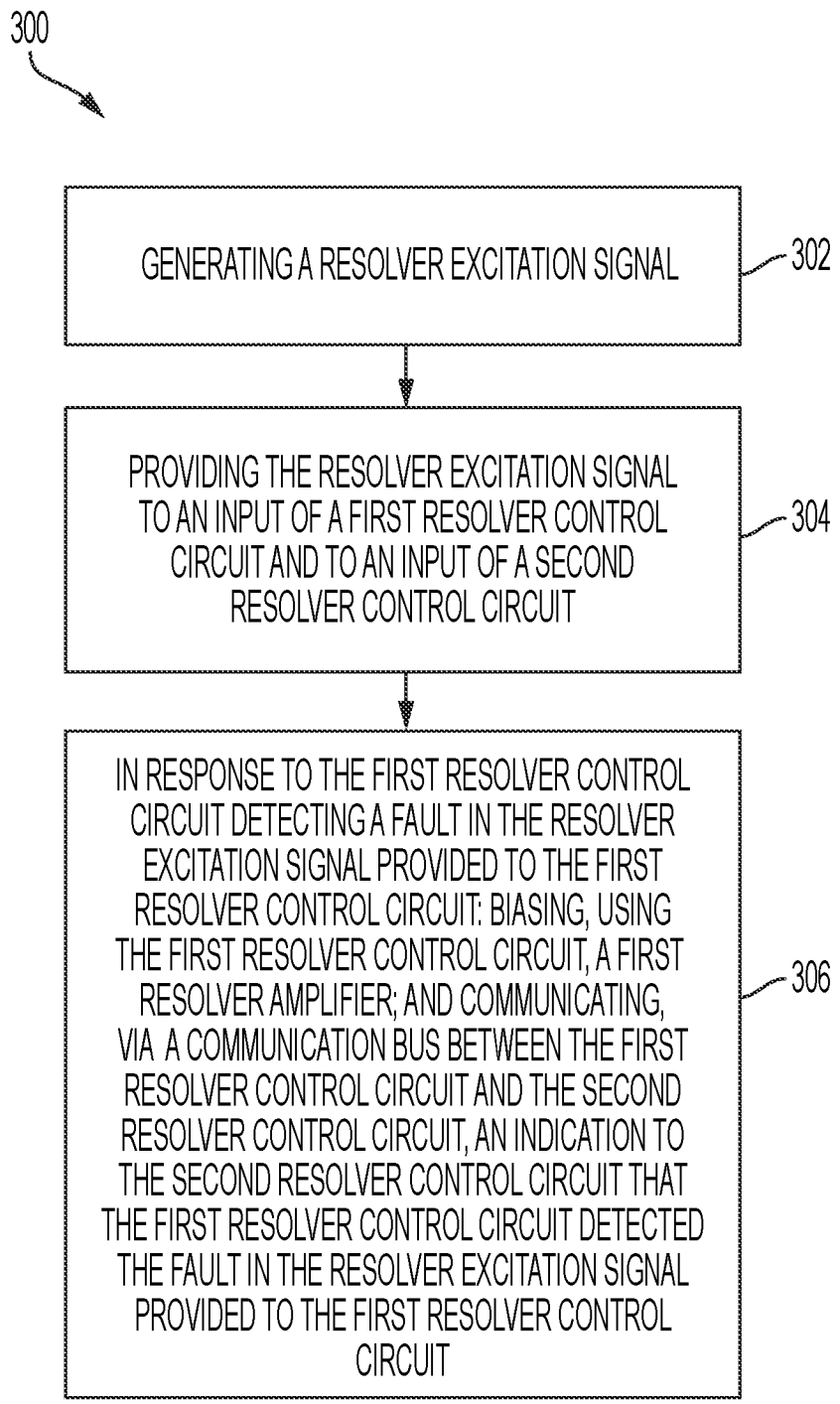
FIG. 4 is a flow diagram generally illustrating a phase-voltage based motor period measurement method according to the principles of the present disclosure.

FIG. 4 is a flow diagram generally illustrating a fail-safe resolver excitation method 300 according to the principles of the present disclosure. At 302, the method 300 generates a resolver excitation signal. For example, the controller 100 may generate the resolver excitation signal.

At 304, the method 300 provides the resolver excitation signal to an input of a first resolver control circuit and to an input of a second resolver control circuit. For example, the controller 100 may provide the resolver excitation signal to an input of a first resolver control circuit 202 and to an input of a second resolver control circuit 204.

At 306, the method 300, in response to the first resolver control circuit detecting a fault in the resolver excitation signal provided to the first resolver control circuit, biases, using the first resolver control circuit, a first resolver amplifier, and communicates, via a communication bus between the first resolver control circuit and the second resolver control circuit, an indication to the second resolver control circuit that the first resolver control circuit detected the fault in the resolver excitation signal provided to the first resolver control circuit. For example, the first resolver control circuit 202 may, in response to detecting a fault in the resolver excitation signal provided to the first resolver control circuit 202, bias the first resolver amplifier 218, and may communicate, via the inter-amplifier communication bus 226, the indication to the second resolver control circuit 204 that the first resolver control circuit 202 detected the fault in the resolver excitation signal provided to the first resolver control circuit 202.

In some embodiments, a method for fail-safe resolver excitation includes generating a resolver excitation signal, providing the resolver excitation signal to an input of a first resolver control circuit and to an input of a second resolver control circuit, and, in response to the first resolver control circuit detecting a fault in the resolver excitation signal provided to the first resolver control circuit: setting a first switch of the first resolver control circuit from a first position to a second position; and providing, via the first switch and to a first resolver amplifier, a first output signal having an output frequency and an amplitude corresponding to the resolver excitation signal.

In some embodiments, the first resolver control circuit is independent from the second resolver control circuit. In some embodiments, the first resolver control circuit is disposed on a first silicon component and the second resolver control circuit is disposed on a second component, separate from the first silicon component. In some embodiments, the method also includes, prior to the first resolver control circuit detecting the fault in the resolver excitation signal provided to the first resolver control circuit, setting the first switch to the first position, wherein, in response to the first switch being set to the first position, the resolver excitation signal provided to the first resolver control circuit is provided to the first resolver amplifier. In some embodiments, the method also includes, in response to the second resolver control circuit detecting a fault in the resolver excitation signal provided to the second resolver control circuit: setting a second switch of the second resolver control circuit from a first position to a second position; and providing, via the second switch and to a second resolver amplifier, a second output signal having an output frequency and an amplitude corresponding to the resolver excitation signal. In some embodiments, the method also includes, prior to the second resolver control circuit detecting the fault in the resolver excitation signal provided to the second resolver control circuit, setting the second switch to the first position, wherein, in response to the second switch being set to the first position, the resolver excitation signal provided to the second resolver control circuit is provided to the second resolver amplifier. In some embodiments, the method also includes, in response to the first resolver control circuit detecting the fault in the resolver excitation signal provided to the first resolver control circuit, fixing the first resolver control circuit to a mid-supply. In some embodiments, the method also includes, in response to receiving, by the second resolver control circuit and via a communication bus between the first resolver control circuit and the second resolver control circuit, an indication that the first resolver control circuit is set to mid-supply, doubling, using the second resolver control circuit, a gain of the second resolver amplifier.

In some embodiments, a system for fail-safe resolver excitation includes a controller having a processor and a memory, the memory including instructions that, when executed by the controller, cause the controller to generate a resolver excitation signal, and provide the resolver excitation signal to an input of a first resolver control circuit and to an input of a second resolver control circuit. The first resolver control circuit, in response to detecting a fault in the resolver excitation signal provided to the first resolver control circuit, sets a first switch of the first resolver control circuit from a first position to a second position, and provides, via the first switch and to a first resolver amplifier, a first output signal having an output frequency and an amplitude corresponding to the resolver excitation signal.

In some embodiments, the first resolver control circuit is independent from the second resolver control circuit. In some embodiments, the first resolver control circuit is disposed on a first silicon component and the second resolver control circuit is disposed on a second component, separate from the first silicon component. In some embodiments, the first resolver control circuit, prior to the first resolver control circuit detecting the fault in the resolver excitation signal provided to the first resolver control circuit, sets the first switch to the first position, and, in response to the first switch being set to the first position, the first resolver control circuit provides the resolver excitation signal provided to the first resolver control circuit to the first resolver amplifier. In some embodiments, the second resolver control circuit, in response to the second resolver control circuit detecting a fault in the resolver excitation signal provided to the second resolver control circuit, sets a second switch of the second resolver control circuit from a first position to a second position, and provides, via the second switch and to a second resolver amplifier, a second output signal having an output frequency and an amplitude corresponding to the resolver excitation signal. In some embodiments, the second resolver control circuit, prior to the second resolver control circuit detecting the fault in the resolver excitation signal provided to the second resolver control circuit, sets the second switch to the first position, and, in response to the second switch being set to the first position, the second resolver control circuit provides the resolver excitation signal provided to the second resolver control circuit to the second resolver amplifier. In some embodiments, the first resolver control circuit, in response to the first resolver control circuit detecting the fault in the resolver excitation signal provided to the first resolver control circuit, fixes the first resolver control circuit to a mid-supply. In some embodiments, the second resolver control circuit, in response to receiving, by the second resolver control circuit and via a communication bus between the first resolver control circuit and the second resolver control circuit, an indication that the first resolver control circuit is set to mid-supply, doubles, using the second resolver control circuit, a gain of the second resolver amplifier.

In some embodiments, an apparatus for fail-safe resolver excitation includes a controller configured to generate a resolver excitation signal and provide the resolver excitation signal to an input of a first resolver control circuit and to an input of a second resolver control circuit. The first resolver control circuit, in response to detecting a fault in the resolver excitation signal provided to the first resolver control circuit, sets a first switch of the first resolver control circuit from a first position to a second position, and provides, via the first switch and to a first resolver amplifier, a first output signal having an output frequency and an amplitude corresponding to the resolver excitation signal. The second resolver control circuit, in response to the second resolver control circuit detecting a fault in the resolver excitation signal provided to the second resolver control circuit, sets a second switch of the second resolver control circuit from a first position to a second position, and provides, via the second switch and to a second resolver amplifier, a second output signal having an output frequency and an amplitude corresponding to the resolver excitation signal.

In some embodiments, the first resolver control circuit is independent from the second resolver control circuit. In some embodiments, the first resolver control circuit is disposed on a first silicon component and the second resolver control circuit is disposed on a second component, separate from the first silicon component. In some embodiments, the first resolver control circuit, prior to the first resolver control circuit detecting the fault in the resolver excitation signal provided to the first resolver control circuit, sets the first switch to the first position, and, in response to the first switch being set to the first position, the first resolver control circuit provides the resolver excitation signal provided to the first resolver control circuit to the first resolver amplifier.

In some embodiments, a method for fail-safe resolver excitation includes generating a resolver excitation signal and providing the resolver excitation signal to an input of a first resolver control circuit and to an input of a second resolver control circuit. The method also includes, in response to the first resolver control circuit detecting a fault in the resolver excitation signal provided to the first resolver control circuit: biasing, using the first resolver control circuit, a first resolver amplifier; and communicating, via a communication bus between the first resolver control circuit and the second resolver control circuit, an indication to the second resolver control circuit that the first resolver control circuit detected the fault in the resolver excitation signal provided to the first resolver control circuit.

In some embodiments, the first resolver control circuit is independent from the second resolver control circuit. In some embodiments, the first resolver control circuit is disposed on a first silicon component and the second resolver control circuit is disposed on a second component, separate from the first silicon component. In some embodiments, the method also includes, in response to the first resolver control circuit not detecting a fault in the resolver excitation signal provided to the first resolver control circuit, setting a first switch of the first resolver control circuit to a first position, wherein, in response to the first switch being set to the first position, the resolver excitation signal provided to the first resolver control circuit is provided to the first resolver amplifier. In some embodiments, the method also includes, in response to the second resolver control circuit detecting a fault in the resolver excitation signal provided to the second resolver control circuit and in response to receiving, by the second resolver control circuit and via the communication bus, the indication that the first resolver control circuit detected the fault in the resolver excitation signal provided to the first resolver control circuit: setting a second switch of the second resolver control circuit from a first position to a second position; doubling, using the second resolver control circuit, a gain of a second resolver amplifier; providing, via the second switch and to a second resolver amplifier, a second output signal having an output frequency and an amplitude associated with an expected resolver excitation signal corresponding to the resolver excitation signal provided to the second resolver control circuit; and communicating, via the communication bus between the first resolver control circuit and the second resolver control circuit, an indication to the first resolver control circuit that the second resolver control circuit detected the fault in the resolver excitation signal provided to the second resolver control circuit. In some embodiments, the method also includes, in response to the second resolver control circuit not detecting the fault in the resolver excitation signal provided to the second resolver control circuit, setting a second switch of the second resolver control circuit to a first position, wherein, in response to the second switch being set to the first position, the resolver excitation signal provided to the second resolver control circuit is provided to a second resolver amplifier. In some embodiments, the method also includes, in response to receiving, by the second resolver control circuit and via the communication bus between the first resolver control circuit and the second resolver control circuit, the indication that the first resolver control circuit detected the fault in the resolver excitation signal provided to the first resolver control circuit, doubling, using the second resolver control circuit, a gain of a second resolver amplifier. In some embodiments, the method also includes, in response to the second resolver control circuit receiving, via the communication bus between the first resolver control circuit and the second resolver control circuit, the indication that the first resolver control circuit detected the fault in the resolver excitation signal provided to the first resolver control circuit and in response to the second resolver control circuit not detecting the fault in the resolver excitation signal provided to the second resolver control circuit: doubling a gain of the second resolver control circuit; and providing, via a second switch of the second resolver control circuit in a first position, the resolver excitation signal provided to the second resolver control circuit to a second resolver amplifier. In some embodiments, the method also includes, in response to the second resolver control circuit detecting a fault in the resolver excitation signal provided to the second resolver control circuit and in response to an absence of a fault in the resolver excitation signal provided to the first resolver control circuit: biasing, using the second resolver control circuit, a second resolver amplifier; and communicating, via the communication bus between the first resolver control circuit and the second resolver control circuit, an indication to the first resolver control circuit that the second resolver control circuit detected the fault in the resolver excitation signal provided to the second resolver control circuit. In some embodiments, the method also includes, in response to receiving, by the first resolver control circuit, from the second resolver control circuit via the communication bus between the first resolver control circuit and the second resolver control circuit, an indication that the second resolver control circuit detected a fault in the resolver excitation signal provided to the second resolver control circuit: doubling, using the first resolver control circuit, a gain of the first resolver amplifier; and providing, via the first switch of the first resolver control circuit in the first position, the resolver excitation signal provided to the first resolver control circuit to the first resolver amplifier. In some embodiments, biasing, using the first resolver control circuit, the first resolver amplifier includes fixing the first resolver amplifier to mid-supply.

In some embodiments, a system for fail-safe resolver excitation includes a controller having a processor and a memory. The memory includes instructions that, when executed by the controller, cause the controller to generate a resolver excitation signal and provide the resolver excitation signal to an input of a first resolver control circuit and to an input of a second resolver control circuit. The first resolver control circuit is configured to, in response to detecting a fault in the resolver excitation signal provided to the first resolver control circuit bias a first resolver amplifier, and communicate, via a communication bus between the first resolver control circuit and the second resolver control circuit, an indication to the second resolver control circuit that the first resolver control circuit detected the fault in the resolver excitation signal provided to the first resolver control circuit.

In some embodiments, the first resolver control circuit is independent from the second resolver control circuit. In some embodiments, the first resolver control circuit is disposed on a first silicon component and the second resolver control circuit is disposed on a second component, separate from the first silicon component. In some embodiments, the first resolver control circuit, in response to not detecting a fault in the resolver excitation signal provided to the first resolver control circuit, sets a first switch of the first resolver control circuit to a first position, wherein, in response to the first switch being set to the first position, the resolver excitation signal provided to the first resolver control circuit is provided to the first resolver amplifier. In some embodiments, the second resolver control circuit, in response to detecting a fault in the resolver excitation signal provided to the second resolver control circuit and in response to receiving, via the communication bus, the indication that the first resolver control circuit detected the fault in the resolver excitation signal provided to the first resolver control circuit, sets a second switch of the second resolver control circuit from a first position to a second position, doubles, using the second resolver control circuit, a gain of a second resolver amplifier, provides, via the second switch and to a second resolver amplifier, a second output signal having an output frequency and an amplitude associated with an expected resolver excitation signal corresponding to the resolver excitation signal provided to the second resolver control circuit, and communicates, via the communication bus between the first resolver control circuit and the second resolver control circuit, an indication to the first resolver control circuit that the second resolver control circuit detected the fault in the resolver excitation signal provided to the second resolver control circuit. In some embodiments, the second resolver control circuit, in response to not detecting the fault in the resolver excitation signal provided to the second resolver control circuit, sets a second switch of the second resolver control circuit to a first position, wherein, in response to the second switch being set to the first position, the resolver excitation signal provided to the second resolver control circuit is provided to a second resolver amplifier. In some embodiments, the second resolver control circuit, in response to receiving, via the communication bus between the first resolver control circuit and the second resolver control circuit, the indication that the first resolver control circuit detected the fault in the resolver excitation signal provided to the first resolver control circuit, doubles, using the second resolver control circuit, a gain of a second resolver amplifier. In some embodiments, the second resolver control circuit, in response to receiving, via the communication bus between the first resolver control circuit and the second resolver control circuit, the indication that the first resolver control circuit detected the fault in the resolver excitation signal provided to the first resolver control circuit and in response to not detecting the fault in the resolver excitation signal provided to the second resolver control circuit, doubles, using the second resolver control circuit, a gain of a second resolver amplifier, and provides, via a second switch of the second resolver control circuit in a first position, the resolver excitation signal provided to the second resolver control circuit to a second resolver amplifier. In some embodiments, the second resolver control circuit, in response to detecting a fault in the resolver excitation signal provided to the second resolver control circuit and in response to an absence of a fault in the resolver excitation signal provided to the first resolver control circuit, biases a second resolver amplifier, and communicates, via the communication bus between the first resolver control circuit and the second resolver control circuit, an indication to the first resolver control circuit that the second resolver control circuit detected the fault in the resolver excitation signal provided to the second resolver control circuit.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for fail-safe resolver excitation, the method comprising:
   generating a resolver excitation signal;
   providing the resolver excitation signal to an input of a first resolver control circuit and to an input of a second resolver control circuit;
   in response to the first resolver control circuit detecting a fault in the resolver excitation signal provided to the first resolver control circuit:
      biasing, using the first resolver control circuit, a first resolver amplifier; and
      communicating, via a communication bus between the first resolver control circuit and the second resolver control circuit, an indication to the second resolver control circuit that the first resolver control circuit detected the fault in the resolver excitation signal provided to the first resolver control circuit.

2. The method of claim 1, wherein the first resolver control circuit is independent from the second resolver control circuit.

3. The method of claim 2, wherein the first resolver control circuit is disposed on a first silicon component and the second resolver control circuit is disposed on a second component, separate from the first silicon component.

4. The method of claim 1, further comprising, in response to the first resolver control circuit not detecting a fault in the resolver excitation signal provided to the first resolver control circuit, setting a first switch of the first resolver control circuit to a first position, wherein, in response to the first switch being set to the first position, the resolver excitation signal provided to the first resolver control circuit is provided to the first resolver amplifier.

5. The method of claim 1, further comprising, in response to the second resolver control circuit detecting a fault in the resolver excitation signal provided to the second resolver control circuit and in response to receiving, by the second resolver control circuit and via the communication bus, the indication that the first resolver control circuit detected the fault in the resolver excitation signal provided to the first resolver control circuit:
   setting a second switch of the second resolver control circuit from a first position to a second position;
   doubling, using the second resolver control circuit, a gain of a second resolver amplifier;
   providing, via the second switch and to the second resolver amplifier, a second output signal having an output frequency and an amplitude associated with an expected resolver excitation signal corresponding to the resolver excitation signal provided to the second resolver control circuit; and
   communicating, via the communication bus between the first resolver control circuit and the second resolver control circuit, an indication to the first resolver control circuit that the second resolver control circuit detected the fault in the resolver excitation signal provided to the second resolver control circuit.

6. The method of claim 1, further comprising, in response to the second resolver control circuit not detecting the fault in the resolver excitation signal provided to the second resolver control circuit, setting a second switch of the second resolver control circuit to a first position, wherein, in response to the second switch being set to the first position, the resolver excitation signal provided to the second resolver control circuit is provided to a second resolver amplifier.

7. The method of claim 1, further comprising, in response to receiving, by the second resolver control circuit and via the communication bus between the first resolver control circuit and the second resolver control circuit, the indication that the first resolver control circuit detected the fault in the resolver excitation signal provided to the first resolver control circuit, doubling, using the second resolver control circuit, a gain of a second resolver amplifier.

8. The method of claim 1, further comprising, in response to the second resolver control circuit receiving, via the communication bus between the first resolver control circuit and the second resolver control circuit, the indication that the first resolver control circuit detected the fault in the resolver excitation signal provided to the first resolver control circuit and in response to the second resolver control circuit not detecting the fault in the resolver excitation signal provided to the second resolver control circuit:
   doubling, using the second resolver control circuit, a gain of a second resolver amplifier; and
   providing, via a second switch of the second resolver control circuit in a first position, the resolver excitation signal provided to the second resolver control circuit to the second resolver amplifier.

9. The method of claim 1, further comprising, in response to the second resolver control circuit detecting a fault in the resolver excitation signal provided to the second resolver control circuit and in response to an absence of a fault in the resolver excitation signal provided to the first resolver control circuit:
   biasing, using the second resolver control circuit, a second resolver amplifier; and
   communicating, via the communication bus between the first resolver control circuit and the second resolver control circuit, an indication to the first resolver control circuit that the second resolver control circuit detected the fault in the resolver excitation signal provided to the second resolver control circuit.

10. The method of claim 1, further comprising, in response to receiving, by the first resolver control circuit, from the second resolver control circuit via the communication bus between the first resolver control circuit and the second resolver control circuit, an indication that the second resolver control circuit detected a fault in the resolver excitation signal provided to the second resolver control circuit:
   doubling, using the first resolver control circuit, a gain of the first resolver amplifier; and
   providing, via a first switch of the first resolver control circuit in a first position, the resolver excitation signal provided to the first resolver control circuit to the first resolver amplifier.

11. The method of claim 1, wherein biasing, using the first resolver control circuit, the first resolver amplifier includes fixing the first resolver amplifier to mid-supply.

12. A system for fail-safe resolver excitation, the system comprising:
   a controller having a processor and a memory, the memory including instructions that, when executed by the controller, cause the controller to:
      generate a resolver excitation signal;
      provide the resolver excitation signal to an input of a first resolver control circuit and to an input of a second resolver control circuit;

the first resolver control circuit is configured to, in response to detecting a fault in the resolver excitation signal provided to the first resolver control circuit:
bias a first resolver amplifier; and
communicate, via a communication bus between the first resolver control circuit and the second resolver control circuit, an indication to the second resolver control circuit that the first resolver control circuit detected the fault in the resolver excitation signal provided to the first resolver control circuit.

13. The system of claim 12, wherein the first resolver control circuit is independent from the second resolver control circuit.

14. The system of claim 13, wherein the first resolver control circuit is disposed on a first silicon component and the second resolver control circuit is disposed on a second component, separate from the first silicon component.

15. The system of claim 12, wherein the first resolver control circuit, in response to not detecting a fault in the resolver excitation signal provided to the first resolver control circuit, sets a first switch of the first resolver control circuit to a first position, wherein, in response to the first switch being set to the first position, the resolver excitation signal provided to the first resolver control circuit is provided to the first resolver amplifier.

16. The system of claim 12, wherein the second resolver control circuit, in response to detecting a fault in the resolver excitation signal provided to the second resolver control circuit and in response to receiving, via the communication bus, the indication that the first resolver control circuit detected the fault in the resolver excitation signal provided to the first resolver control circuit:
sets a second switch of the second resolver control circuit from a first position to a second position;
doubles, using the second resolver control circuit, a gain of a second resolver amplifier;
provides, via the second switch and to the second resolver amplifier, a second output signal having an output frequency and an amplitude associated with an expected resolver excitation signal corresponding to the resolver excitation signal provided to the second resolver control circuit; and
communicates, via the communication bus between the first resolver control circuit and the second resolver control circuit, an indication to the first resolver control circuit that the second resolver control circuit detected the fault in the resolver excitation signal provided to the second resolver control circuit.

17. The system of claim 12, wherein the second resolver control circuit, in response to not detecting the fault in the resolver excitation signal provided to the second resolver control circuit, sets a second switch of the second resolver control circuit to a first position, wherein, in response to the second switch being set to the first position, the resolver excitation signal provided to the second resolver control circuit is provided to a second resolver amplifier.

18. The system of claim 12, wherein the second resolver control circuit, in response to receiving, via the communication bus between the first resolver control circuit and the second resolver control circuit, the indication that the first resolver control circuit detected the fault in the resolver excitation signal provided to the first resolver control circuit, doubles, using the second resolver control circuit, a gain of a second resolver amplifier.

19. The system of claim 12, wherein the second resolver control circuit, in response to receiving, via the communication bus between the first resolver control circuit and the second resolver control circuit, the indication that the first resolver control circuit detected the fault in the resolver excitation signal provided to the first resolver control circuit and in response to not detecting the fault in the resolver excitation signal provided to the second resolver control circuit:
doubles, using the second resolver control circuit, a gain of a second resolver amplifier; and
provides, via a second switch of the second resolver control circuit in a first position, the resolver excitation signal provided to the second resolver control circuit to the second resolver amplifier.

20. The system of claim 12, wherein the second resolver control circuit, in response to detecting a fault in the resolver excitation signal provided to the second resolver control circuit and in response to an absence of a fault in the resolver excitation signal provided to the first resolver control circuit:
biases a second resolver amplifier; and
communicates, via the communication bus between the first resolver control circuit and the second resolver control circuit, an indication to the first resolver control circuit that the second resolver control circuit detected the fault in the resolver excitation signal provided to the second resolver control circuit.

* * * * *